No. 660,116. Patented Oct. 23, 1900.
O. MEYER.
PROCESS OF SEPARATING TIN FROM TIN SCRAP.
(Application filed Nov. 20, 1899.)
(No Model.)
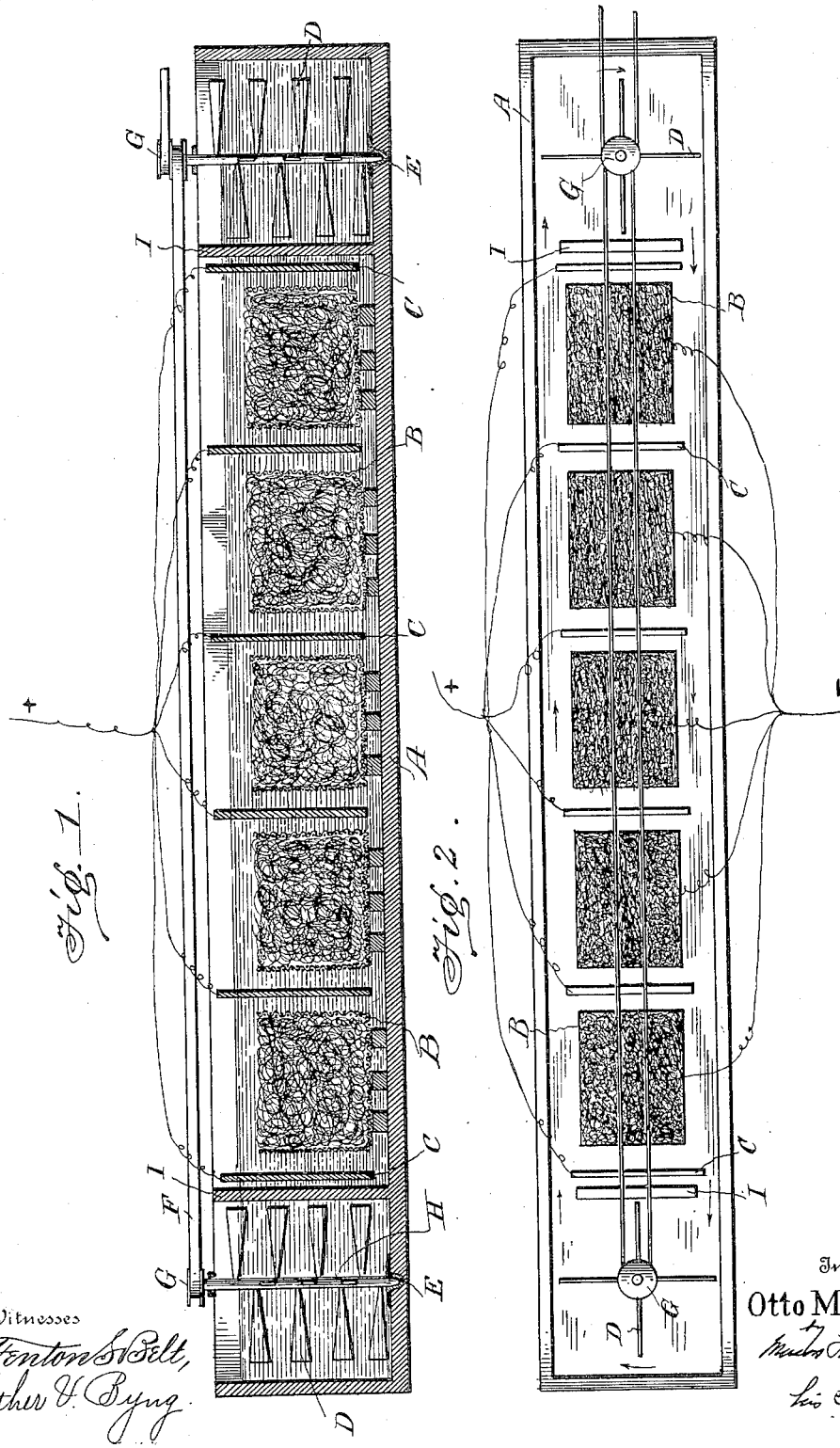
Witnesses
Fenton S. Belt,
Esther V. Byng.
Inventor;
Otto Meyer,
his Attorneys.

UNITED STATES PATENT OFFICE.

OTTO MEYER, OF RICHMOND, VIRGINIA, ASSIGNOR OF THREE-FOURTHS TO SIMON M. BLOCK AND HENRY FROEHLING, OF SAME PLACE.

PROCESS OF SEPARATING TIN FROM TIN-SCRAP.

SPECIFICATION forming part of Letters Patent No. 660,116, dated October 23, 1900.

Application filed November 20, 1899. Serial No. 737,619. (No specimens.)

*To all whom it may concern:*

Be it known that I, OTTO MEYER, a citizen of the United States, residing at Richmond, in the county of Henrico and State of Virginia, have invented certain new and useful Improvements in Processes of Separating Tin from Tin Scrap or Plate; and I do hereby declare the following to be a full, clear, and exact description of the invention, such as will enable others skilled in the art to which it appertains to make and use the same.

My invention relates to a process for separating tin from tin scrap or plate, and has for its object the provision of an improved process for this purpose which will be very simple in its production and cheap to carry out and at the same time very effective in its results.

Heretofore processes for removing tin from tin scrap or plate have been devised; but most of them have been more or less expensive and unsatisfactory in the results obtained and for that reason have not come into general use.

As stated above, the object of my present invention is to so simplify and cheapen the process as to render it a commercial success.

With this object in view my invention consists in submerging a bulk of tin scrap or plate in a bath of strong muriatic acid in about the proportion of two parts water to one part acid, which acts as an electrolyte and which in itself will not appreciably attack the tin of the scrap, but will appreciably attack the iron of the scrap after the tin is removed to form protochlorid of iron, which forms a strong electrolyte in itself and which is employed in repeating the process without replenishing the bath for a considerable length of time, the tin-scrap in bulk being connected with the positive pole and forming the anode and a sheet of metal connecting the negative pole and forming the cathode, on which latter a deposit of tin is continuously formed in a condition of a dense sponge, this being accomplished by maintaining the electric current at a uniform and high degree of amperage.

In the accompanying drawings, Figure 1 is a vertical longitudinal section through a tank which I employ in carrying out my process and showing means for circulating the liquid and also showing the baskets containing scrap and the plates of metal upon which the removed tin is deposited, the plates and scrap being connected with a suitable electric generator. (Not shown.) Fig. 2 is a plan view of the same.

In carrying out my process I employ a suitable tank A, constructed, preferably, of wood, so that it will not be attacked by the acid solution. In this tank are arranged any number of open-work baskets B, preferably of wood, containing tin-scrap to be treated, and also arranged within the tank are a number of metal plates C, preferably of copper, upon which the tin removed from the scrap is deposited. The scrap in the baskets is connected with the positive pole of a dynamo (not shown) and forms the anode, and the metal plates C are connected with the negative pole and form the cathode. The baskets and tin-scrap contained therein are completely submerged in the bath, as shown. For keeping the bath in circulation any suitable means may be employed, such as an acid-pump, by means of which the solution is taken from one end of the tank and passed into another tank; but I prefer to employ a turbine, as D, arranged at each end of the tank and operated in any suitable manner—as, for instance, by belting, as F, which passes around pulleys G, applied on the upper end of the shafts H of the turbines D in the ordinary manner. The shafts H are preferably constructed of wood and are seated in bearings E, which latter are preferably constructed of glass, said bearings being suitably secured in the bottom of the tank— as, for instance, by means of concrete and asphalt. The blades of the turbine are constructed of wood and are forced into sockets formed in the shafts H and held in place without the use of nails or other metal fastenings.

I represents partitions arranged at each end of the tank in front of the turbines, which partitions do not extend all the way across the tank, so that a passage is left between the ends of the partitions and the sides of the tank for directing the circulation, said direction of the circulation being indicated by the arrows.

The bath is preferably formed with muriatic acid of one part acid to two parts water. The material employed, and particularly the proportions in which it is mixed with the water, is very important. I have found by experimenting that the proportions named are the best for the results desired. If the solution is made very weak—as, for instance, two and one-half parts muriatic acid to ninety-seven and one-half parts water—it is impractical in working on a large scale on account of the length of time required and the necessity of frequent replenishing and other disadvantages, the tendency of the tin being to peel off instead of being deposited in the form of a dense sponge on the cathode. While it is possible to remove tin from a piece of scrap with a solution of hydrochloric acid of two and one-half parts acid to ninety-seven and one-half parts water, such a solution is impractical in working with tin-scrap in lots of one hundred pounds or more, such as I have used and such as working on a commercial scale requires. I have found that an acid solution was needed which, while not in itself appreciably attacking the tin of the scrap, will in itself appreciably attack the iron of the scrap in order to produce protochlorid of iron. Another reason why such an acid in about the proportions named should be used is that I have found that the protochlorid of iron formed is in itself a fine electrolyte. Therefore my solution in the process not only removes the tin from large lots of scrap in a comparatively short period of time, but can also be used effectively for a considerable length of time without being replenished by a new solution or an addition of acid, by reason of which facts the process can be very cheaply and satisfactorily carried out.

Although the bath when made in about the proportions of two parts water to one part of muriatic acid will not in itself appreciably attack the tin, it is obvious that when the electric current is let on the tin on the scrap at the anode is rapidly dissolved and is continuously deposited at the cathode. It is important that the tin should be deposited at the cathode in the form of a dense sponge, so that it can be readily removed. This is accomplished by maintaining the electric current at a uniform and high degree of amperage. I regard the employment of a strong solution of muriatic acid in about the proportions of two parts water to one part acid at a normally-low temperature, whereby the tin of the scrap is not appreciably attacked, but the iron of the scrap after the tin is removed is strongly attacked to produce protochlorid of iron, which in itself acts as an electrolyte, and the combining as a part of the same process the maintaining of an electric current at a uniform and high degree of amperage as the distinctively-novel feature of my invention. The process is interrupted when the tin is removed from the scrap and the iron commences to dissolve freely, which is indicated by a strong evolution of gas at the scrap. The scrap is then disconnected at the electrode and the baskets taken out and a new lot of scrap introduced into the bath for treatment. In successive uses of the same bath it becomes richer in protochlorid of iron, which, as stated above, acts as a fine electrolyte.

Having now described my invention, what I claim as new, and desire to secure by Letters Patent, is—

The process herein described for separating tin from tin scrap or plate, which consists in subjecting the scrap or plate to a strong bath composed of muriatic acid in about the proportions of two parts water to one part acid, which acts as an electrolyte, but which in itself does not appreciably attack the tin of the scrap but does appreciably attack the iron of the scrap after the tin is removed forming protochlorid of iron, which forms an electrolyte in itself, and connecting the tin-scrap in bulk with the positive pole of an electric generator and forming an anode, and connecting a sheet of metal with the negative pole of the electric generator and forming the cathode, and subjecting the scrap to an electric current which is maintained at such uniform and high degree of amperage, as to continuously deposit the tin on the cathode in the condition of a dense sponge, and cutting off the current after the tin is removed from the scrap and removing the remaining iron of the scrap, and introducing new lots of tin-scrap without having to replenish the bath by the addition of muriatic acid at the end of each operation.

In testimony whereof I hereunto affix my signature in presence of two witnesses.

OTTO MEYER.

Witnesses:
SIMON M. BLOCK,
JOS. MITTELDORFER.